United States Patent [19]

Orgun et al.

[11] Patent Number: 5,089,968
[45] Date of Patent: Feb. 18, 1992

[54] GROUND EFFECTS COMPENSATED REAL TIME AIRCRAFT BODY ANGLE OF ATTACK ESTIMATION

[75] Inventors: Munir Orgun, Woodinville; Timothy C. McRoberts, Bothell; Tzong-Hsiu B. Wu, Redmond, all of Wash.

[73] Assignee: The Boeing Company, Seattle, Wash.

[21] Appl. No.: 471,102

[22] Filed: Jan. 26, 1990

[51] Int. Cl.$^5$ .............................................. G05D 1/00
[52] U.S. Cl. ................................. 364/435; 364/428; 340/967; 244/181
[58] Field of Search ................ 364/428, 435; 340/966, 340/967, 968; 244/76 R, 178, 181

[56] References Cited

U.S. PATENT DOCUMENTS

| | | | |
|---|---|---|---|
| 3,686,626 | 8/1972 | Bateman et al. | 364/435 |
| 3,814,912 | 6/1974 | Manke et al. | 364/428 |
| 4,027,839 | 6/1977 | Quinlivan | 340/966 |
| 4,530,060 | 7/1985 | Greene | 364/428 |
| 4,893,245 | 1/1990 | Zweifel | 364/435 |
| 5,000,404 | 3/1991 | Martorella | 364/435 |

Primary Examiner—Gary Chin
Attorney, Agent, or Firm—Christensen, O'Connor, Johnson & Kindness

[57] ABSTRACT

Disclosed is a method of and an arrangement for generating a ground effects compensated aircraft body angle of attack signal. The disclosed method includes converting an aircraft pitch rate corrected alpha vane signal to a free air body angle of attack signal that is calibrated to the type of aircraft that employs the invention for the two conventional landing flap settings. The free air body angle of attack signal then is processed to obtain an alpha vane correction signal that represents ground effects compensation that would be required at zero altitude (aircraft touchdown). The zero altitude alpha vane correction signal is then multipled by an altitude scaling signal and converted to a ground effects compensation signal that is applicable to the then current altitude of the aircraft. The ground effects compensation signal then is summed with the free air corrected body angle of attack signal to provide the ground effects compensated body angle of attack signal of the invention.

19 Claims, 4 Drawing Sheets

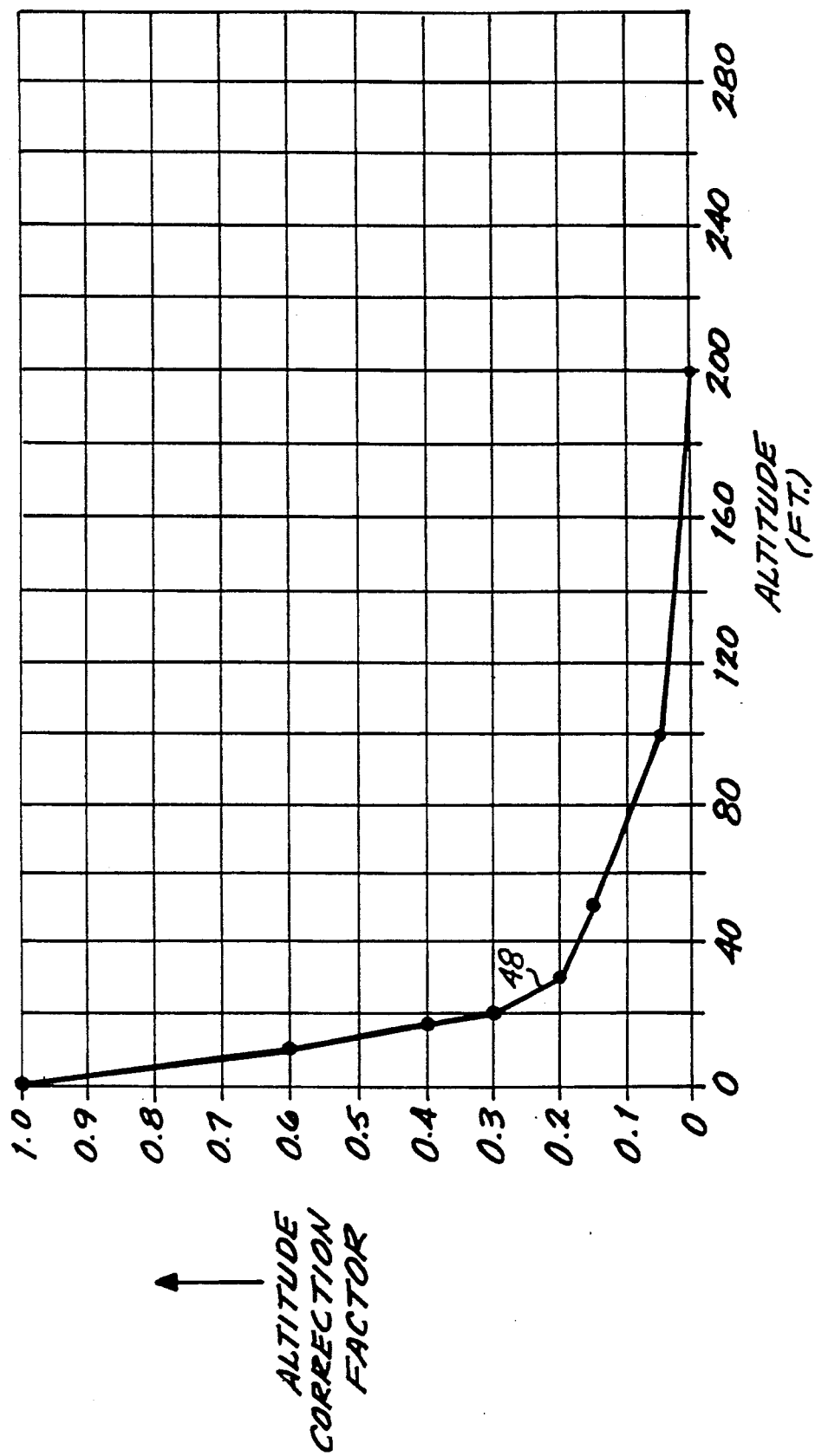

GROUND EFFECTS COMPENSATED REAL TIME AIRCRAFT BODY ANGLE OF ATTACK ESTIMATION

FIELD OF THE INVENTION

This invention relates to methods of an apparatus for supplying a signal that is representative of aircraft body angle of attack. More specifically, this invention relates to methods and apparatus for compensating aircraft body of attack signals relative to ground effect induced errors.

BACKGROUND OF THE INVENTION

Vane-type angle of attack sensors typically are mounted to the fuselage or other exterior structure of an aircraft so that the sensor vane will be angularly deflected by airflow passing along the surface of the aircraft at the location of the sensor. In various flight control systems, the signal supplied by such a vanetype sensor (referred to as an alpha vane signal) is converted to a signal representative of the aircraft body angle of attack, which is used to establish gain scheduling and/or open loop compensation.

In certain situations, the alpha vane signals supplied by currently available sensors and the methods and arrangements for converting the alpha vane signals to aircraft body angle of attack signals are at least somewhat undesirable. One such situation arises with respect to automatic landing systems that guide an aircraft along glideslope and localizer beams so that the aircraft approaches and lands at a destination runway without manual control by the pilot.

In automatic landing systems, the problem presented by prior art vane-type angle of attack sensors relates to ground effects that occur during the landing procedure when the aircraft altitude is less than approximately one wingspan. Specifically, as the aircraft approaches the ground, the local flow in front of the wing changes its upward motion due to ground compression. These ground effects result in airflow disturbances that cause prior art vane-type angle of attack sensors to supply erroneous signals. Since the body angle of attack signals that are obtained from the alpha vane signal are used in an automatic landing system for gain scheduling and open loop compensation in various control laws that control the aircraft throughout the landing procedure, ground effect induced signal errors can affect important automatic landing characteristics such as vertical path control of the aircraft and touchdown dispersion. For example, in some instances, ground effect induced errors in the alpha vane signal (and, hence the aircraft body angle of attack signal) may be incorrectly interpreted by the automatic landing system as a vertical wind gust. In these instances, the automatic landing system may initiate unnecessary control action which, unless counteracted by additional system control action, will result in less than optimal landing performance.

SUMMARY OF THE INVENTION

This invention provides a method and an arrangement for ground effect compensation of body angle of attack signals of the type conventionally used in automatic landing systems and other avionics equipment. The arrangement and method provided by the invention allows real time estimation of aircraft body angle of attack as the aircraft is maneuvered at low altitudes. That is, in accordance with the invention, signal processing to provide compensation for ground effect induced errors in an aircraft body angle of attack signal can be performed within the iteration periods that are conventionally employed in the signal processors of currently available automatic landing and flight control systems.

In accordance with the signal processing method of the invention, the alpha vane signal provided by the aircraft digital air data computer or an equivalent source is initially processed to correct the alpha vane signal for aircraft pitch rate. The pitch rate corrected alpha vane signal then is processed to provide a free air body angle of attack signal that is calibrated to the particular type of aircraft that employs the invention for the two flap settings that are used during landing procedures. As used herein, free air body angle of attack signal refers to a body angle of attack signal that is produced in the absence of ground effects. A ground effects compensation signal is then generated by processing the free air body angle of attack signal with a schedule that provides the relationship between free air body angle of attack and the correction that would be required at zero altitude for that particular aircraft type (i.e., required when the aircraft touches down on the runway) and by multiplying the scheduled signal that results by an altitude scale factor. The ground effects compensation signal then is summed with the free air corrected body angle of attack signal to provide the ground effect compensated body angle of attack signal of the invention.

BRIEF DESCRIPTION OF THE DRAWINGS

The various advantages and features of the invention will be more fully understood in view of the following detailed description when taken in conjunction with the drawings in which:

FIG. 4 is an exemplary graphical depiction of an altitude scale factor that is used in the practice of the invention.

DETAILED DESCRIPTION

Figure 1:
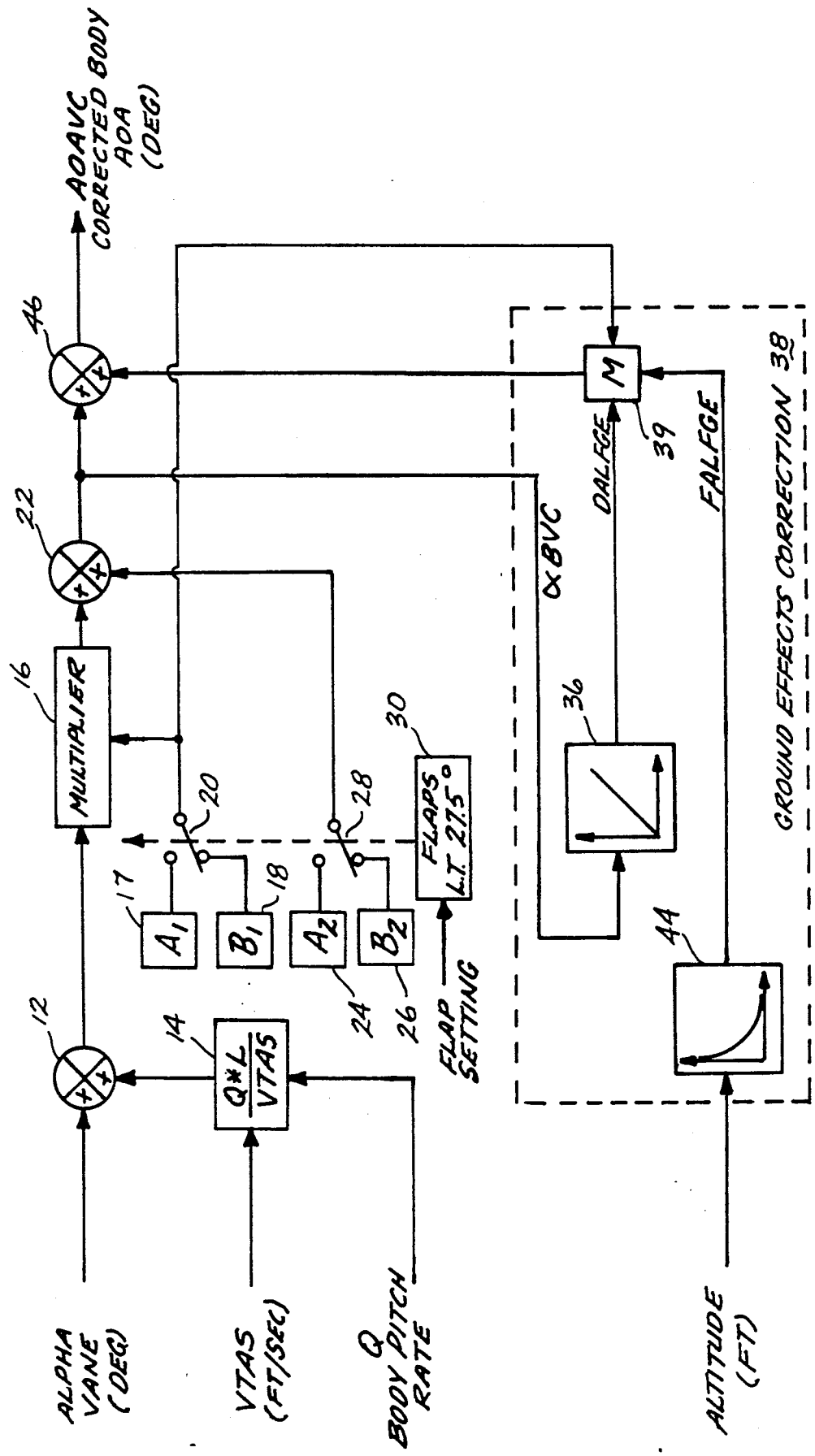
FIG. 1 is a block diagram that illustrates the manner in which the invention processes alpha vane signals to provide a ground effects compensated body angle of attack signal.

In the arrangement of the invention that is shown in FIG. 1, the alpha vane signal initially is processed to generate an alpha vane signal that is corrected for aircraft pitch rate. More specifically, in the arrangement of FIG. 1, the alpha vane signal is supplied to an additive (+) input of a summing network 12. Supplied to a second additive (+) input of summing network 12 is a signal representative of the quantity Q*L/VTAS (indicated at block 14). In this expression, VTAS represents the aircraft filtered true airspeed, Q represents the aircraft body pitch rate, and L represents the distance between location of the aircraft center of gravity and the aircraft inertial reference unit (IRU) or similar measuring device which provides the aircraft pitch rate and other aerodynamic measurements. As will be recognized by those skilled in the art, various signal processing methods and arrangements exist for generating a pitch corrected alpha vane signal equivalent to the signal that is provided at the output of summing network 12 of FIG. 1.

In the arrangement of FIG. 1, the pitch rate corrected alpha vane signal is supplied to a multiplier 16 that multiplies the pitch rate corrected alpha vane signal by a multiplicative factor $A_1$ (indicated at block 17) or by a multiplicative factor $B_1$ (indicated at block 18), depending upon the position of a switch 20. The product of the multiplicative factor ($A_1$ or $B_1$) and the pitch rate corrected alpha vane signal is supplied by multiplier 16 to a summing network 22 and added either to an additive factor $A_2$ (indicated at block 24) or to an additive factor $B_2$ (indicated at block 26), depending upon the setting of the switch 28. As is indicated at block 30, the depicted switches 20 and 28 are operated in accordance with landing flap position. Specifically, for landing flap position 25° (i.e., flaps less than 27.5° in FIG. 1), the signal provided by summing network 22 corresponds to $A_1\alpha_c + A_2$, where $\alpha_c$ represents the pitch rate corrected alpha vane signal. When the landing flap setting is 30°, the signal provided by summing network 22 corresponds to $B_1\alpha_c + B_2$.

Figure 2:
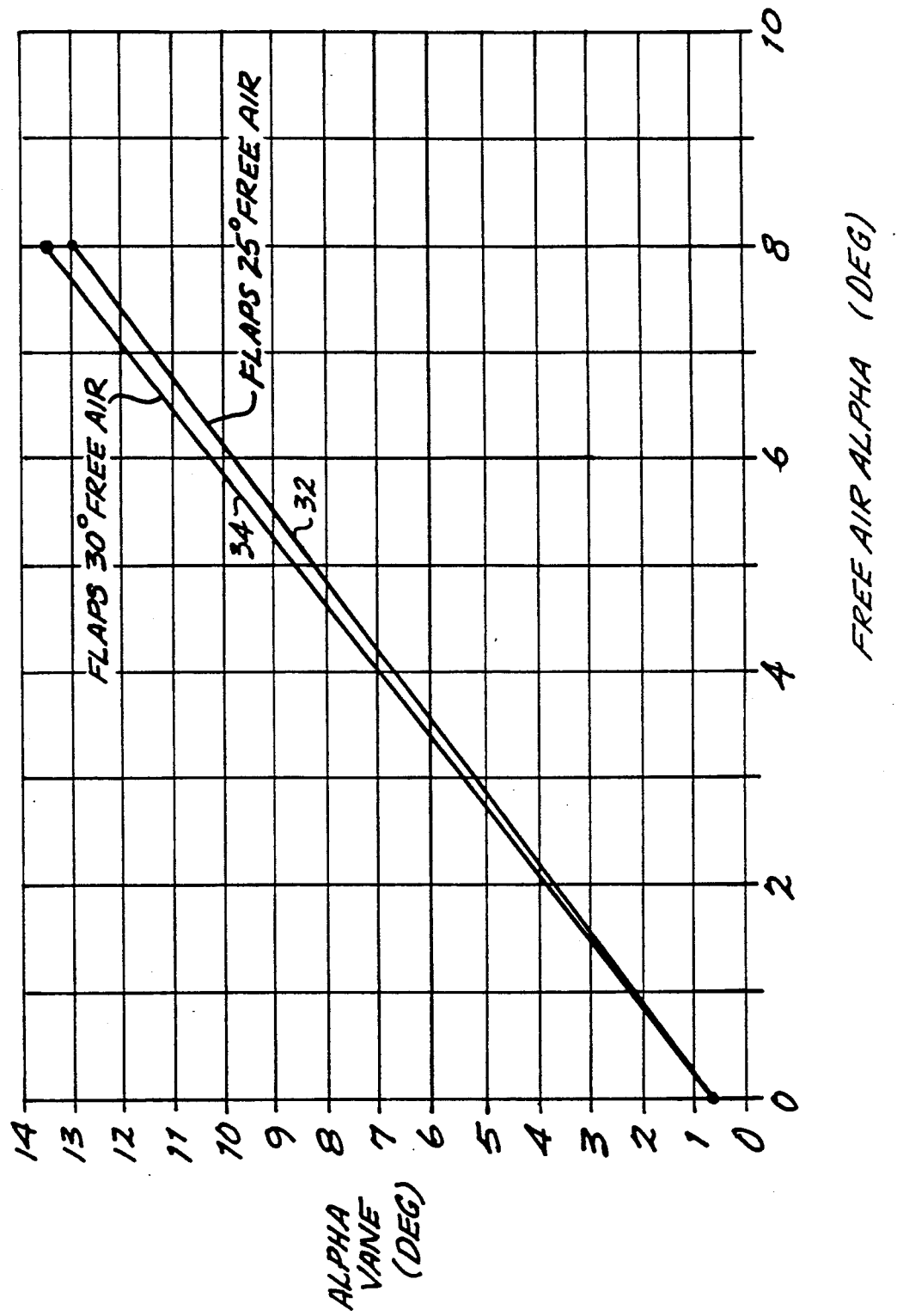
FIG. 2 is an exemplary graphical depiction of the relationship between alpha vane signals and free air aircraft body of attack signals for one particular type of aircraft, with the relationship being shown for landings executed with 30° and 25° flap settings.

In the practice of the invention, $A_1$ and $A_2$ respectively are the slope and intercept values of straight line that closely approximates the relationship between pitch rate corrected alpha vane signal and a corresponding free air aircraft body angle of attack signal for a particular type of aircraft when landings are executed with a flap setting of 25°. Similarly, $B_1$ and $B_2$ respectively are the slope and intercept values of a straight line approximation to the relationship between pitch rate corrected alpha vane signal and free air aircraft body angle of attack for that particular type of aircraft when landings are executed with a 30° flap setting. An example of the straight line relationship between pitch rate compensated alpha vane signal and free air body angle of attack is shown in FIG. 2, with line 32 being a straight line that defines the relationship for landing flap setting 25° and line 34 being a straight line that defines the relationship for landing flap setting 30°. The manner in which data are obtained and processed to define these straight line relationships (i.e., determine the multiplicative factors $A_1$ and $B_1$ and the additive factors $A_2$ and $B_2$) shall be described in more detail in the following paragraphs.

Figure 3:
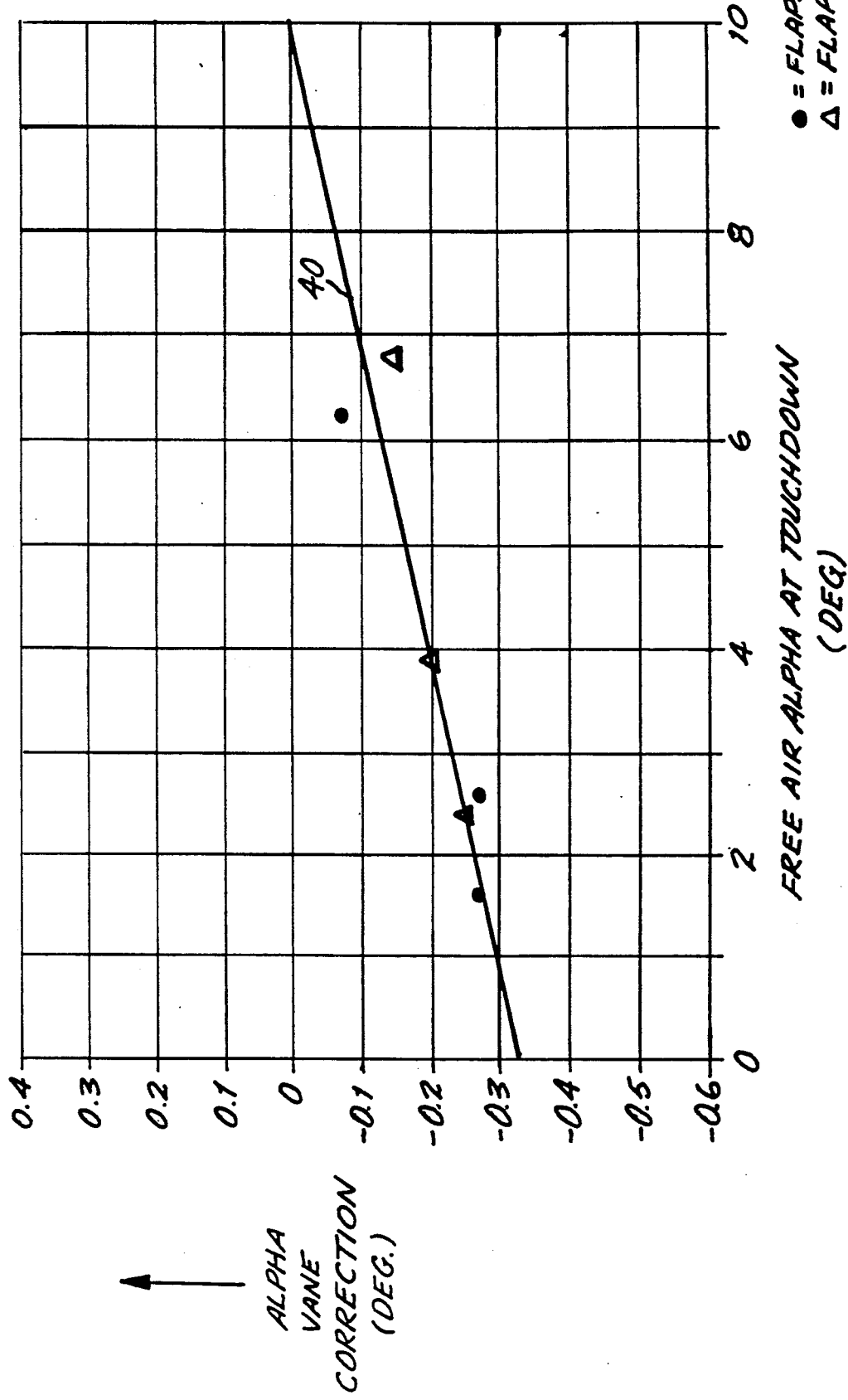
FIG. 3 is an exemplary graphical depiction of the alpha vane correction used in the practice of the invention relative to providing ground effects compensated aircraft body angle of attack signals.

Continuing with the description of FIG. 1, the free air body angle of attack signal that is supplied by summing network 22 is coupled to a scheduling block 36 of a ground effects correction unit 38. As is symbolically indicated in FIG. 1, scheduling block 36 in effect is a multiplier circuit that establishes the signal supplied to a multiplier 39 in accordance with a scheduled coordinate relationship. In the practice of the invention, the schedule used by scheduling block 36 sets forth the relationship between an alpha vane correction and aircraft body angle of attack at the point of landing touchdown for the type of aircraft employing the invention. An exemplary relationship of the type used by scheduling block 36 is shown in FIG. 3 and is indicated by reference numeral 40. The manner in which flight data are obtained for a particular type aircraft and processed to provide the appropriate schedule will be discussed hereinafter.

Continuing with the description of ground effects correction unit 38 of FIG. 1, a second input of multiplier 39 is connected for receiving a signal supplied by a scheduling block 44, which receives an altitude signal from the aircraft radio altimeter. In the practice of the invention, scheduling block 44 provides an altitude scale factor (FALFGE in FIG. 1) which is multiplied by the alpha vane correction, DALFGE.

It will be recognized that multiplying the alpha vane correction signal DALFGE by the altitude scale factor FALFGE provides a signal representative of the incremental change required to correct the pitch rate corrected alpha vane signal. To, in effect, convert the product of the alpha vane correction signal and the alpha vane scale factor to the incremental change required to correct the body angle of attack signal, a third input terminal of multiplier 39 is connected for receiving the multiplicative factor ($A_1$ or $B_1$) that is selected by switch 20 in the process of converting the pitch rate corrected alpha vane signal to a free air body angle of attack signal. Configured in this manner, multiplier 39 produces a signal representative of the correction required to compensate the free air aircraft body angle of attack signal for ground effect induced errors in the alpha vane signal at the current altitude of the aircraft, as indicated by the aircraft radio altimeter. Thus, when the correction (product) signal supplied by multiplier 39 is summed with the free air body angle of attack signal (indicated by summing network 46), a ground effect compensated body angle of attack signal is obtained. The ground effect compensated body angle of attack signal supplied by summing network 46 is then made available for use in the flight control system that employs the invention for establishing control law open loop compensation and gains that are dependent upon aircraft body angle of attack and are executed while the aircraft is at or below an altitude that is approximately equal to one wingspan.

As is indicated in scheduling block 44, the relationship between the altitude signal supplied by the aircraft radio altimeter and the altitude correction factor generally corresponds to an exponentially decaying waveform. An exemplary altitude/altitude correction scheduling relationship for one particular type of aircraft is shown in FIG. 4 and is identified by reference numeral 48. In viewing FIG. 4, it can be noted that the altitude correction factor exhibits a maximum value of unity at altitude zero and decreases in the previously mentioned substantially exponential manner, reaching zero at an altitude approximately equal to one wingspan (200 feet in FIG. 4).

The currently preferred method for collecting the flight data required to establish the previously discussed scheduling for any particular aircraft involves a flight test procedure that differs from the conventional procedure for gathering ground effects data and data for alpha vane calibration. Specifically, in the conventional flight test procedure, the aircraft is flown near the ground while maintaining a constant altitude and test flights are made at various altitudes. The flight test procedure utilized for acquiring data for the practice of the invention involves landing the aircraft with constant vertical speed being maintained throughout the landing approach. In aircraft so equipped, this can be accomplished with the flight control system vertical speed mode engaged and the automatic throttle system disengaged. Otherwise, manual control can be utilized. Preferably, the flight tests are conducted in calm air using various approach speeds to obtain different angles of attack.

Data recorded during the flight tests are then processed in the following manner. First, the flight path angles of the various landings are determined based on the recorded aircraft vertical speed and true air speed. The body angle of attack for the landings is next determined on the basis of the previously determined flight path angles and the pitch angle that was indicated by the aircraft inertial reference system and recorded during the flight test landings. Touchdown times of the landings are then determined on the basis of recorded landing gear load signals. The data that were recorded after aircraft touchdown are discarded and the remaining data are filtered to eliminate signal components caused by factors such as structural vibration and the sampling rate of the flight test data recording system.

To obtain an alpha vane/free air aircraft body angle of attack relationship of the type shown in FIG. 2 and discussed above, flight test data for altitudes equal to and less than the aircraft wingspan are eliminated and the remaining data are processed for landing flap setting 25° and landing flap setting 30° to obtain alpha vane free air body angle of attack approximations for each of the two landing flap settings. In experience to date, these relationships exhibit a weak quadratic characteristic and, for the alpha vane range of interest, can be approximated by straight lines. As was described previously, the slope and intercept values of these lines determine the multiplicative and additive values $A_1$, $B_1$, $A_2$, and $B_2$ for the arrangement of FIG. 1.

The above-described data that were obtained by eliminating data collected after the aircraft touched down and by filtering those data allows determination both of the altitude correction factor/aircraft altitude relationship (i.e., the relationship described relative to scheduling block 44 of FIG. 1) and the alpha vane correction/free air body angle of attack at aircraft touchdown relationship (i.e., the relationship described relative to scheduling block 36 of FIG. 1).

To determine the alpha vane correction schedule required for the abovediscussed ground effects compensation, the alpha vane signal at a radio altimeter altitude greater than the aircraft wingspan is subtracted from the alpha vane signal recorded at radio altimeter altitude zero (aircraft touchdown). When plotted versus free air aircraft body angle of attack at touchdown, a relationship such as the previously discussed relationship of FIG. 3 results.

The altitude correction factor relationship then is determined by dividing alpha vane correction factors for a number of different radio altimeter altitudes by an alpha vane correction factor that is determined at a radio altimeter altitude that is greater than the wingspan of the aircraft (i.e., is obtained at an altitude at which there is no ground effect. When plotted versus altitude, the altitude correction factor will be similar to the exemplary relationship shown in FIG. 4.

It will be recognized by those skilled in the art that the signal processing of the invention can easily be implemented in currently available flight control systems and autopilots that implement automatic landing procedures by processing digitally encoded data. Specifically, it can be recognized that the signal processing required in the practice of the invention easily can be executed within typical system iteration periods and that the above-discussed relationships that adapt the invention to each particular aircraft can be stored in system memory in look-up table form or can be generated by other conventional techniques.

The embodiments of the invention in which an exclusive property or privilege is claimed are defined as follows:

1. A method of processing an aircraft alpha vane angle of attack signal to generate a ground effects compensated body angle of attack signal in a flight control system of an aircraft, said method comprising the steps of:

combining said alpha vane angle of attack signal with signals representative of aircraft pitch rate and aircraft speed to generate a pitch rate corrected alpha vane angle of attack signal;

processing said pitch rate corrected alpha vane angle of attack signal to generate a free air body angle of attack signal;

processing said free air body angle of attack signal to generate a ground effects compensation signal representative of ground effects compensation required at the current altitude of said aircraft;

combining said ground effects compensation signal with said free air body angle of attack signal to generate said ground effects compensated body angle of attack signal and; supplying said ground effects compensated body angle of attack signal to said flight control system for controlling said aircraft.

2. The method of claim 1 wherein said pitch rate corrected alpha vane angle of attack signal is processed to generate a first free air body angle of attack signal when the landing flaps of said aircraft are set at a first predetermined position and is processed to generate a second free air body angle of attack signal when said aircraft landing flaps are set at a second predetermined position.

3. The method of claim 2 wherein said step of processing said pitch corrected alpha vane angle of attack signal to generate said first free air body angle of attack signal comprises the step of multiplying said pitch rate corrected alpha vane angle of attack signal by a first multiplicative factor and adding to a product of said first multiplicative factor and said pitch rate corrected alpha vane angle of attack signal a first additive factor; and wherein said processing of said pitch rate corrected alpha vane angle of attack signal to generate said second free air body angle of attack signal comprises the step of multiplying said pitch rate corrected alpha vane angle of attack signal by a second multiplicative factor and adding to a product of said second multiplicative factor and said pitch rate corrected alpha vane angle of attack signal a second additive factor.

4. The method of claim 3 wherein said step of generating said signal representative of ground effects compensation required for the current altitude of said aircraft includes the steps of processing said free air body angle of attack signal to generate a ground effects compensation signal required at zero altitude of said aircraft and scaling said ground effects compensation signal by an altitude scale factor.

5. The method of claim 4 wherein said first and second multiplicative factors, said first and second additive factors, said ground effects compensation signal required at zero altitude of said aircraft and said altitude scale factor are based on data recorded during flight tests of said aircraft.

6. The method of claim 1 wherein said step of generating said signal representative of ground effects compensation required for the current altitude of said aircraft includes the steps of processing said free air body angle of attack signal to generate a ground effects compensation signal required at zero altitude of said aircraft and scaling said ground effects compensation signal by an altitude scale factor.

7. The method of claim 6 wherein said ground effects compensation signal required at zero altitude of said aircraft and said altitude scale factor are based on data recorded during flight testing of said aircraft.

8. The method of claim 1 wherein said free air body angle of attack signal is generated on the basis of a straight line approximation to the relationship between said pitch rate corrected alpha vane angle of attack signal and said free air body angle of attack signal.

9. The method of claim 8 wherein a first straight line approximation to the relationship between said pitch rate corrected alpha vane angle of attack signal and said free air body angle of attack signal is employed when the landing flaps of said aircraft are set at a first predetermined position and wherein a second straight line approximation to the relationship between said pitch rate corrected alpha vane angle of attack signal and said free air body angle of attack signal is employed when said aircraft flaps are set at a second predetermined position.

10. The method of claim 9 wherein said first and second straight line approximations between said pitch rate corrected alpha vane angle of attack signal and said free air body angle of attack signal are based on flight test data.

11. The method of claim 10 wherein said step of generating said signal representative of ground effects compensation required for the current altitude of said aircraft includes the steps of processing said free air body angle of attack signal to generate a ground effects compensation signal required at zero altitude of said aircraft and scaling said ground effects compensated signal by an altitude scale factor.

12. The method of claim 11 wherein said ground effects compensation signal required at zero altitude of said aircraft and said altitude scale factor are based on flight test data.

13. Apparatus for supplying a ground effects compensated body angle of attack signal, said apparatus comprising:
means responsive to a signal representative of aircraft alpha vane angle of attack and a signal representative of aircraft body pitch rate for supplying a compensated alpha vane angle of attack signal;
means responsive to said compensated alpha vane angle of attack signal for supplying a signal representative of the aircraft free air body angle of attack;
means for scaling said signal representative of aircraft free air body angle of attack to supply a signal representative of the ground effects compensation required at substantially zero altitude of said aircraft;
means responsive to a signal representative of aircraft altitude for supplying an altitude scale factor representative of the amount of ground effects compensation signal required at aircraft altitudes ranging from substantially zero altitude to an altitude approximately equal to the wingspan of said aircraft;
means for multiplying said signal representative of the ground effects compensation required at substantially zero altitude of said aircraft by said altitude scale factor to supply a signal representative of the free air body angle of attack compensation required for a current altitude of said aircraft; and
means for combining said free air body angle of attack signal with said signal representative of the free air body angle of attack compensation required for said current altitude of said aircraft.

14. The apparatus of claim 13 wherein said means for supplying a compensated alpha vane angle of attack signal includes means for summing said signal representative of said aircraft alpha vane of attack with a signal that is proportional to said signal representative of aircraft body pitch rate.

15. The apparatus of claim 14 wherein said signal that is proportional to said signal representative of aircraft body pitch rate is representative of said aircraft body pitch rate divided by the true airspeed of said aircraft.

16. The apparatus of claim 13 wherein said means for supplying said signal representative of aircraft free air body angle of attack includes means for multiplying said compensated alpha vane angle of attack signal by a first predetermined constant and adding a second predetermined constant to the signal that results when said compensated alpha vane angle of attack signal is multiplied by said first predetermined constant.

17. The apparatus of claim 16 wherein said means for supplying said signal representative of aircraft free air body angle of attack further comprises means for multiplying said compensated alpha vane angle of attack signal by a third predetermined constant and adding a fourth predetermined constant to said signal resulting from multiplying said compensated alpha vane angle of attack signal by said third predetermined constant; said means for supplying said signal representative of aircraft free air body angle of attack being responsive to a signal representative of the flap setting of said aircraft and including means for supplying said signal incorporating said first and second predetermined constants when said signal representative of said aircraft flap setting is indicative of a first flap setting and for supplying said signal incorporating said third and fourth predetermined values when said signal representative of said aircraft flap setting is indicative of a second flap setting.

18. The apparatus of claim 17 wherein said means for supplying a compensated alpha vane angle of attack signal includes means for summing said signal representative of said aircraft alpha vane of attack with a signal that is proportional to said signal representative of aircraft body pitch rate.

19. The apparatus of claim 18 wherein said signal proportional to said signal representative of aircraft body pitch rate is representative of said aircraft body pitch rate divided by the true airspeed of said aircraft.

* * * * *